April 9, 1940.  R. E. LEE  2,196,314
METHOD OF MEASURING THE INHERENT TERRESTRIAL
MAGNETISM OF THE EARTH'S CRUST
Filed Feb. 14, 1938  3 Sheets-Sheet 1
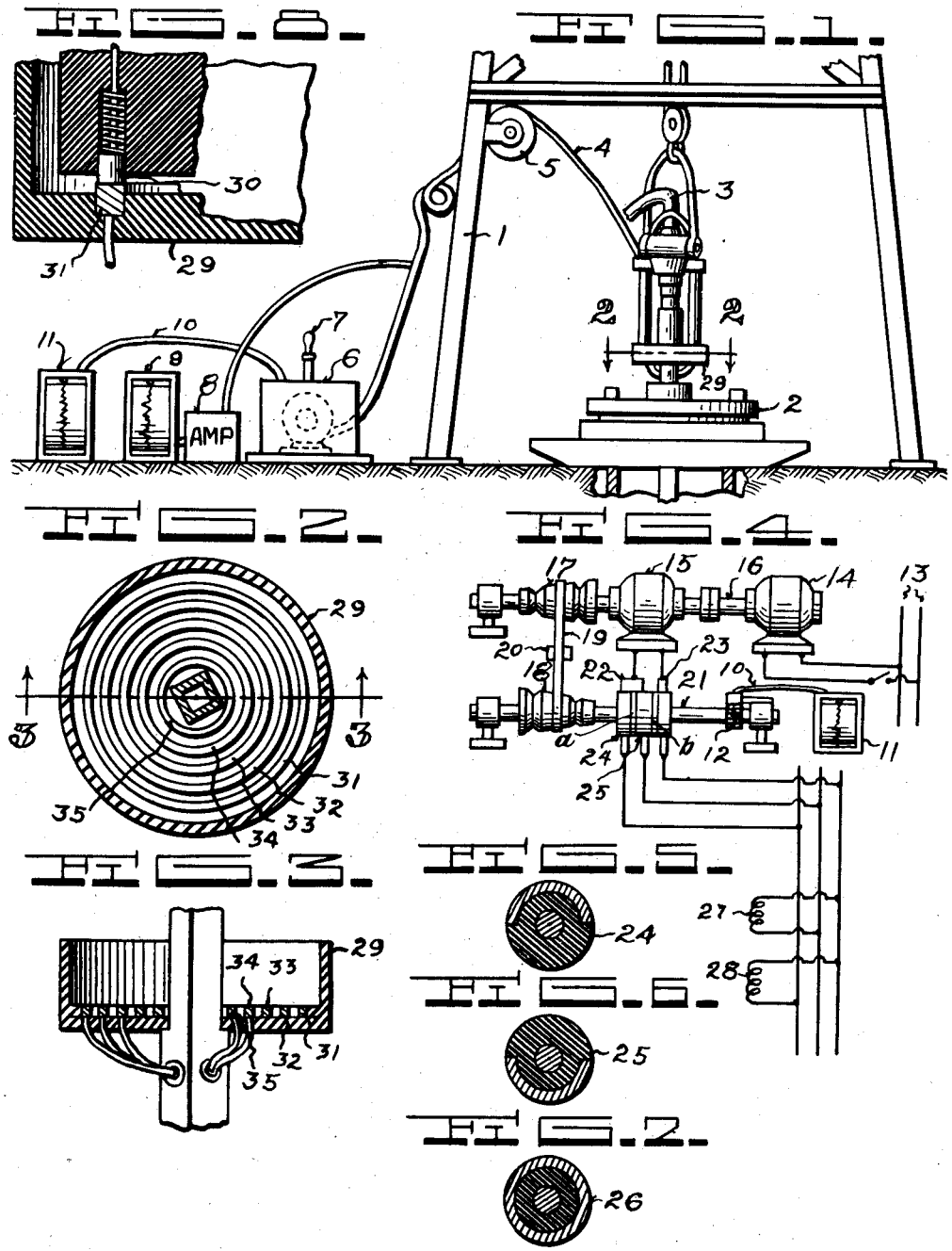

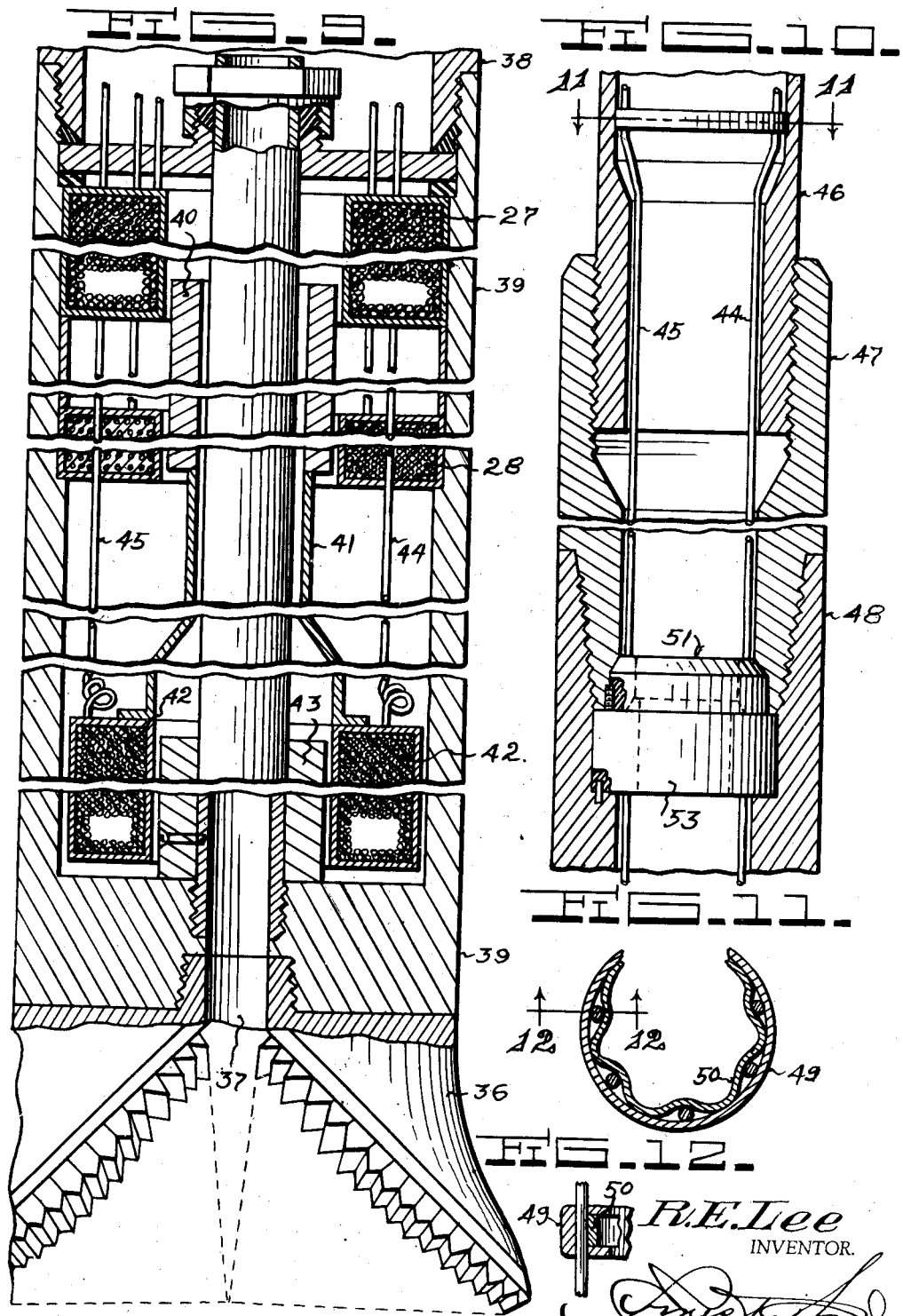

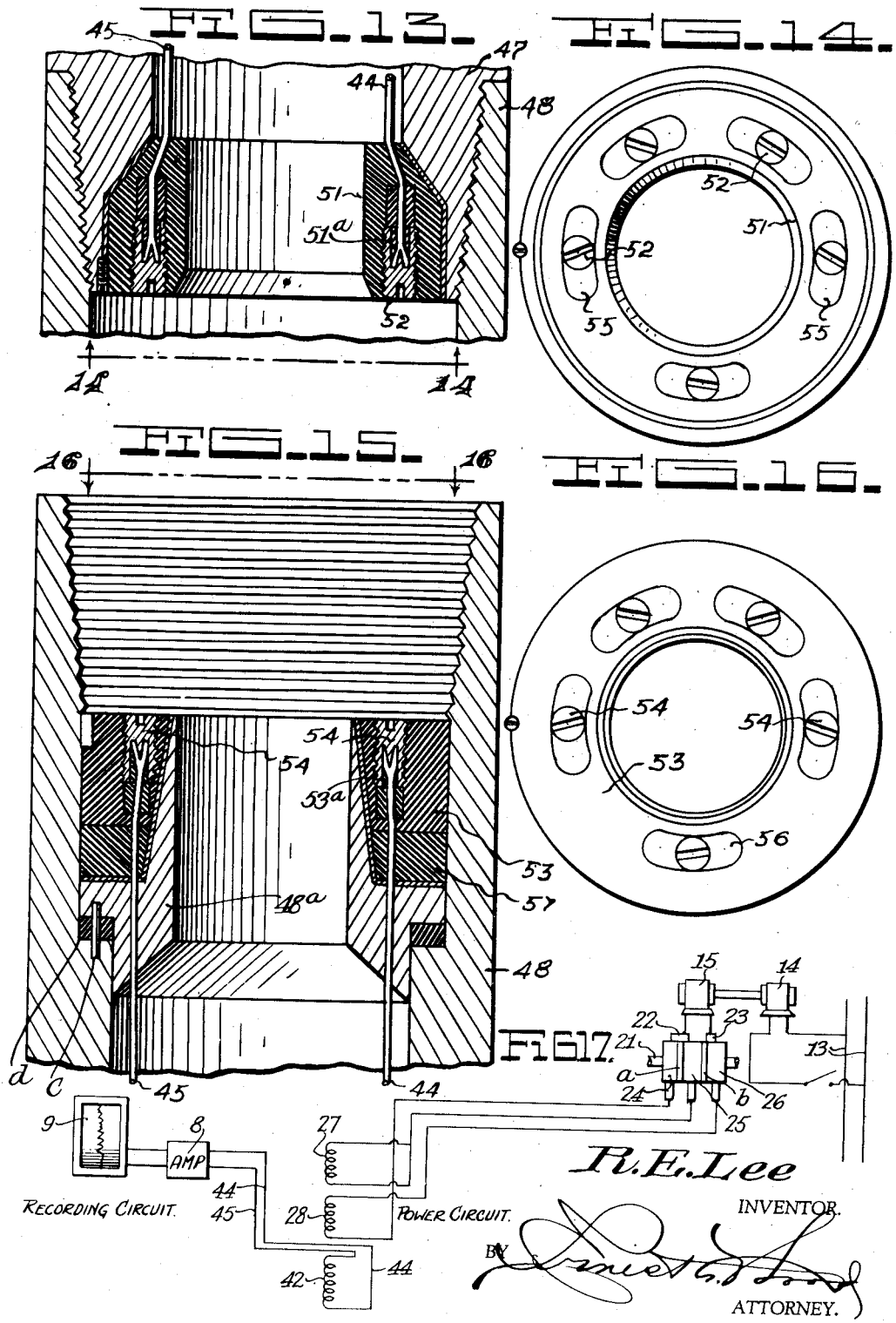

Patented Apr. 9, 1940

2,196,314

UNITED STATES PATENT OFFICE 2,196,314

METHOD OF MEASURING THE INHERENT TERRESTRIAL MAGNETISM OF THE EARTH'S CRUST

Robert E. Lee, Coleman, Tex., assignor of fifty per cent to Joseph H. Reynolds, Cisco, Tex.

Application February 14, 1938, Serial No. 190,477

9 Claims. (Cl. 175—182)

This invention relates to the measurement of the inherent terrestrial magnetic flux flowing through the crust of the earth.

The principal object of the invention is to provide a method and apparatus whereby measurements may be made to determine the tectonics of sub-surface geology.

Another object of the invention is to provide means whereby a record may be obtained during the progress of an earth boring tool relative to formations as encountered.

Still another object is to provide a method by which measurements may be made which will indicate the nature of a formation below an earth boring tool.

Yet another object of the invention is to provide a method by which formations in abnormal stress below an earth boring tool may be indicated before the said formations are encountered by the earth boring tool.

Another object is the provision of a method by which hydrostatic formation stress may be indicated before a formation having the hydrostatic stress is encountered by a drilling bit.

Still another object is to provide means by which an electric circuit may be completed between a drilling bit and derrick floor and suitably insulated from metallic parts of the drill stem or wire cable.

Yet another object is to provide a practical and efficient electrical coupling through tool joints on a drill stem, by means of which electrical contacts may be made during the normal operation of making up or breaking the tool joints when going in or coming out of the bore hole with the drill stem.

Broadly the invention comprehends a method and apparatus by which inherent terrestrial magnetism may be measured and interpreted.

An induction coil, when reciprocated at a constant and uniform rate of speed and arranged to envelop a stationary soft iron magnet within an hermetically sealed chamber adjacent to a drilling bit is effective in interrupting the magnetic flux of the earth and consequently an electrical current is induced which may be recorded by a suitable galvanometer, with amplification through vacuum tubes when necessary.

Primarily, when an exploration is to be made according to the present invention, it is necessary to determine the daily and secular magnetic values within the region to be explored, which is accomplished by measuring the intensity or force (in gausses) of the magnetic flux at the surface of the earth, thereby establishing a base from which anomalies and curve abberations may be interpreted.

The relationship between electromotive-force, coil turns, flux and frequency of vibration, may be expressed by the following equation:

$$E = 4Nf\Phi \times 10^{-8}$$

wherein:

E = volts inducted in coil
N = number of turns in coil
$\Phi$ = flux in the iron (lines)
$f$ = frequency of vibration The flow of magnetic lines through a bar of iron by dividing the "magnetizing force of the helix" by the "resistance of the lines of force" of the iron.

The law of the magnetic circuit may be stated as follows:

$$\text{Magnetic flux} = \frac{\text{magnetomotive-force}}{\text{reluctance}}$$

or $$F = \frac{M}{Z}$$

The magnetomotive-force is dependent on the strength of the current and on the number of turns by which it is interlinked with the magnetic circuit.

Formerly it was usual to give the name of magnetomotive-force to $$\frac{4\pi}{10}$$

times the number of ampere-turns but in modern usage the ampere-turns themselves are taken as the magnetomotive-force and the numeric $$\frac{4\pi}{10}$$

then comes as a divisor into the calculation of the reluctance.

*Reluctance.*—As the electric resistance of a prismatic conductor can be calculated from its length, cross-section, and conductivity, so the magnetic reluctance of a bar of iron can be calculated from its length, cross-section, and permeability.

The principal difference between the two cases lies in the circumstance that whilst in the electric case the conductivity is the same for small and large currents, in the magnetic case the permeability is not constant, but is less for large magnetic fluxes than for small magnetic fluxes.

Let the length of the bar of iron be 1 centims., its section A sq. cms., and its permeability $\mu$, then its reluctance will be proportional directly to 1 and inversely to A and $\mu$. Calling the reluctance Z we have $$Z = \frac{1}{A\mu} + \frac{4\pi}{10}$$

$$Z = \frac{1}{A\mu} \times 0.796$$

Referring to the drawings:

Figure 1 is a fragmentary view of a drilling rig, shown with attendant parts of the present invention, Figure 2 is a view taken on the line 2—2 on Figure 1, Figure 3 is a view taken on the line 3—3 on Figure 2, Figure 4 is a diagrammatic view of the wiring arrangement and showing a mechanical movement capable of controlling a reciprocating element, Figure 5 is a view in cross section of one of the commutator rings, Figure 6 is a view in cross section of the companion ring shown in Figure 5, Figure 7 is a cross sectional view of the insulated slip ring, Figure 8 is a fragmentary view showing the means for making electrical connection between stationary and rotating parts of the drill stem, Figure 9 is a fragmentary view in elevation of the assembly adjacent the drill bit, Figure 10 is a fragmentary view in vertical cross section of the means for making electrical contact between the pin contact assembly and the box contact assembly, Figure 11 is a view taken on the line 11—11 on Figure 10, Figure 12 is a fragmentary view taken on the line 12—12 on Figure 11, Figure 13 is a fragmentary view in vertical cross section of the means for making electrical contact from the wires through the box and pin of a tool joint, Figure 14 is a view taken on the line 14—14 on Figure 13, Figure 15 is a fragmentary view in elevation of the companion assembly to Figure 13, Figure 16 is a view taken on the line 16—16 on Figure 15, and Figure 17 is a circuit diagram of the entire wiring system, showing both the power circuit and the recording circuit.

Referring primarily to Figure 1, the reference numeral 1 denoted a conventional derrick having a rotary drilling table 2, the assembly being provided with a swivel 3 as shown.

A cable 4 carrying a plurality of insulated wires is positioned around a pulley 5, and is connected to a control box 6. Within the control box 6 an assembly illustrated in Figure 4, is positioned. This assembly is manually or coordinately controlled through the medium of a lever 7.

Voltage changes impressed upon wires within the cable 4 are amplified by means of a conventional amplifying unit 8, which changes in voltage are registered upon a galvanometer 9, preferably of the recording type, as shown.

Since it is necessary to record revolutions of the commutating arrangement shown in Figure 4, which arrangement is to be hereinafter described, a flexible cable 10 serves to positively connect a recording tachometer 11 to a drive shaft through the medium of gearing 12.

Referring next to Figure 4, 13 denotes a source of electric power supplied to a motor 14 which is mechanically connected to a direct current generator 15, through a shaft 16.

An inverse cone, multiple step speed changer, comprised of units 17 and 18 interconnected by a belt 19, which belt may be suitably moved laterally by means of a shifting fork or pulley 20, so that the rate of revolution of a shaft 21 may be controlled and preferably held constant at all times. This rate of revolution is transmitted and recorded upon the recording tachometer 11 by means of the flexible cable 10 and the gearing 12.

Direct current supplied by the generator 15 is supplied to a pair of brushes 22 and 23. The brush 22 serves to simultaneously contact a commutator 24, illustrated in Figure 5 and a commutator 25 illustrated in Figure 6. The brush 23 serves to contact a slip ring 26 illustrated in cross section in Figure 7. It will be understood that the commutating units illustrated in Figures 5, 6 and 7 are suitably insulated from the shaft 21 and also insulated from each other, by means of the insulating rings $a$ and $b$.

Thus it will be seen that coils 27 and 28 are alternately energized, for the purpose to be hereinafter explained.

Referring next to Figure 8, 29 denotes a housing constructed of a suitable insulating material. Since current must be transmitted from a non-rotating unit to units which rotate as drilling proceeds, spring pressed brushes 30 are provided, one of which is shown in Figure 8. These brushes serve to contact slip rings 31, 32, 33, 34 and 35. Insulated lead wires connected to these slip rings enter the Kelly joint as illustrated in Figure 3.

Figure 9 illustrates the assembly adjacent to an earth boring drill bit 36 having a water course 37. This assembly is threadably connected to a conventional tool joint 38, and is comprised primarily of a unit 39 of non-ferrous material. It will be understood that an hermetically sealed chamber is provided by the construction as shown.

The actuating coils 27 and 28 illustrated in crosss section in Figure 9, and diagrammatically in Figure 4, when alternately energized serve to reciprocate a ferrous core 40. This core is secured to a cylindrical and non-ferrous unit 41 which unit in turn is secured to an induction coil 42. The induction coil 42 is arranged to surround a fixed ferrous, annular ring 43.

Thus it will be seen that when the coils 27 and 28 are alternately energized, as hereinabove described, the ferrous unit 40 will be alternately raised and lowered and consequently the attendant parts 41, and 42, attached thereto will be moved in unison with the member 40. The resultant effect is the interruption of the inherent terrestrial magnetism flowing through the member 43. Accordingly, an E. M. F. is impressed upon the circuit which includes the coil 42 and the wires 44 and 45 which wires lead to the surface and the voltage impressed thereon may be, when necessary, amplified by the unit 8 and changes or variations in the voltage are recorded upon a chart 9. From the variations recorded upon the chart 9, interpretations may be made relative to the tectonics of the subsurface geology.

Figures 10, 11, 12, 13, 14, 15 and 16 illustrate the means by which the circuits hereinabove described may be completed.

Referring next to Figure 10, the reference numeral 46 represents a conventional drill stem, which stem is threadably connected to a tool joint pin section 47, which latter is threadably connected to the box section 48.

Since it is required to lead a plurality of wires within the confines of the drill assembly stabilizers, illustrated in cross section in Figures 11 and 12 are spaced within the various units. These stabilizers are comprised of broken rings 49, which rings surround the broken rings 50 which are formed as shown in Figure 11. The various wires interposed between the rings 49 and 50, as shown in Figure 11, are thereby stabilized from the effect of the circulating medium through the drill stem.

It will be understood that by means of the structure herein described and illustrated, sections of drill stem may be made up or taken apart without additional effort, and the electrical circuits are substantially and effectively insulated and sealed throughout the drill stem from the effects of the metallic parts as well as the circulating medium. Moreover, the circuits herein described are insulated and are completed without the aid of the earth as a ground. The tool joint pin section and the tool joint box section assemblies are illustrated in Figures 13, 14, 15 and 16. By means of the assembles illustrated and to be hereinafter described, the various electrical circuits are insulated, sealed and completed.

As illustrated in Figure 13 an annular ring 51, formed as shown, serves to house the conducting wires of the circuits. These wires are electrically connected to metallic screws 52. The ring 51 is locked in a predetermined position relative to the tool joint pin section 47.

An annular ring 53 is positioned within the box section of the tool joint, and is locked against rotary motion thereto in a predetermined position, but is free to move longitudinally thereto within fixed limits. Metallic screws 54 serve to make electrical contact with their respective wires of the circuits. The screws 52 and 54 serve to effect contact with conducting segments 55 and 56, respectively. These segments are embedded within the rings 51 and 53. The purpose of these segments is to provide ample contact in a predetermined position when the tool joint is made up to full shoulder.

The annular ring 53 is mounted above an annular ring 57, which ring is comprised of a resilient and insulating material. This ring further serves as a sealing means. Thus it is obvious that desired contacts may be made by the normal operations of screwing up the tool joint to full shoulder and the resiliency of the ring 57 is effective in urging longitudinally the ring 53 which ring contacts under pressure the ring 51 when the tool joint is screwed up to full shoulder.

Manifestly, the construction as shown and described is capable of some modification and such modification as may be construed within the scope and meaning of the appended claims is also considered to be within the spirit and intent of the invention.

It will be noted that a pin c is positioned as shown in Fig. 15 to prevent relative rotation between the member 48 and the member 48ᵃ. Interposed between these members is a packing ring d.

Within the annular insulated rings 51 and 53 resilient sockets 51ᵃ and 53ᵃ are provided as shown. The purpose of these resilient sockets is to insure positive contacts at all times between the respective wire conductors when the tool joint is made up to full shoulder.

What is claimed is:

1. A method for determining the tectonics of subsurface geology which comprises reciprocating a magnetic unit adjacent to a drilling bit and in recording the electrical current resulting therefrom.

2. A method for determining the tectonics of the earth's strata during the progress of an earth boring tool, which comprises vibrating a coil adjacent to said tool, and in recording the electromotive force resulting from the vibrations of said coil.

3. A method for exploring bore holes as drilling progresses which comprises impressing a constant and fixed electromotive force on a coil positioned adjacent to an earth boring drill bit, in reciprocating said coil, and in recording the electromotive force resulting from the reciprocation of said coil.

4. A method for exploring bore holes as drilling progresses which comprises vibrating a magnetic unit adjacent to drilling bit, in amplifying current from said magnetic unit, and in continuously recording said amplified current.

5. A method for measuring the inherent terrestrial magnetic flux flowing through the crust of the earth which comprises reciprocating an electrically charged coil positioned beneath the earth's surface and in continuously recording the electromotive force resulting from the reciprocation of said coil.

6. A method for determining the nature of a formation in advance of an earth boring tool which comprises subjecting a coil positioned adjacent to said tool to a relative movement with respect to a ferrous body, and in recording the electromotive force resulting therefrom.

7. In the method of determining the nature of strata in advance of a drilling bit, the step of continuously recording the electromotive force resulting from reciprocations of a coil positioned adjacent to said drilling bit.

8. A method for measuring the inherent terrestrial magnet flux flowing through the crust of the earth which comprises reciprocating a solenoid positioned adjacent to a drilling bit and in recording the electromotive force resulting from the reciprocation of said solenoid.

9. A method for measuring the inherent terrestrial magnet flux flowing through the earth which comprises reciprocating a solenoid positioned adjacent to a drilling bit and arranged to surround a ferrous core, and in recording the electromotive force resulting from the reciprocations of said solenoid.

ROBERT E. LEE.